March 2, 1937. A. R. BLAKEY 2,072,834
FRACTIONAL DISTILLATION OF LIQUIDS
Filed April 10, 1935
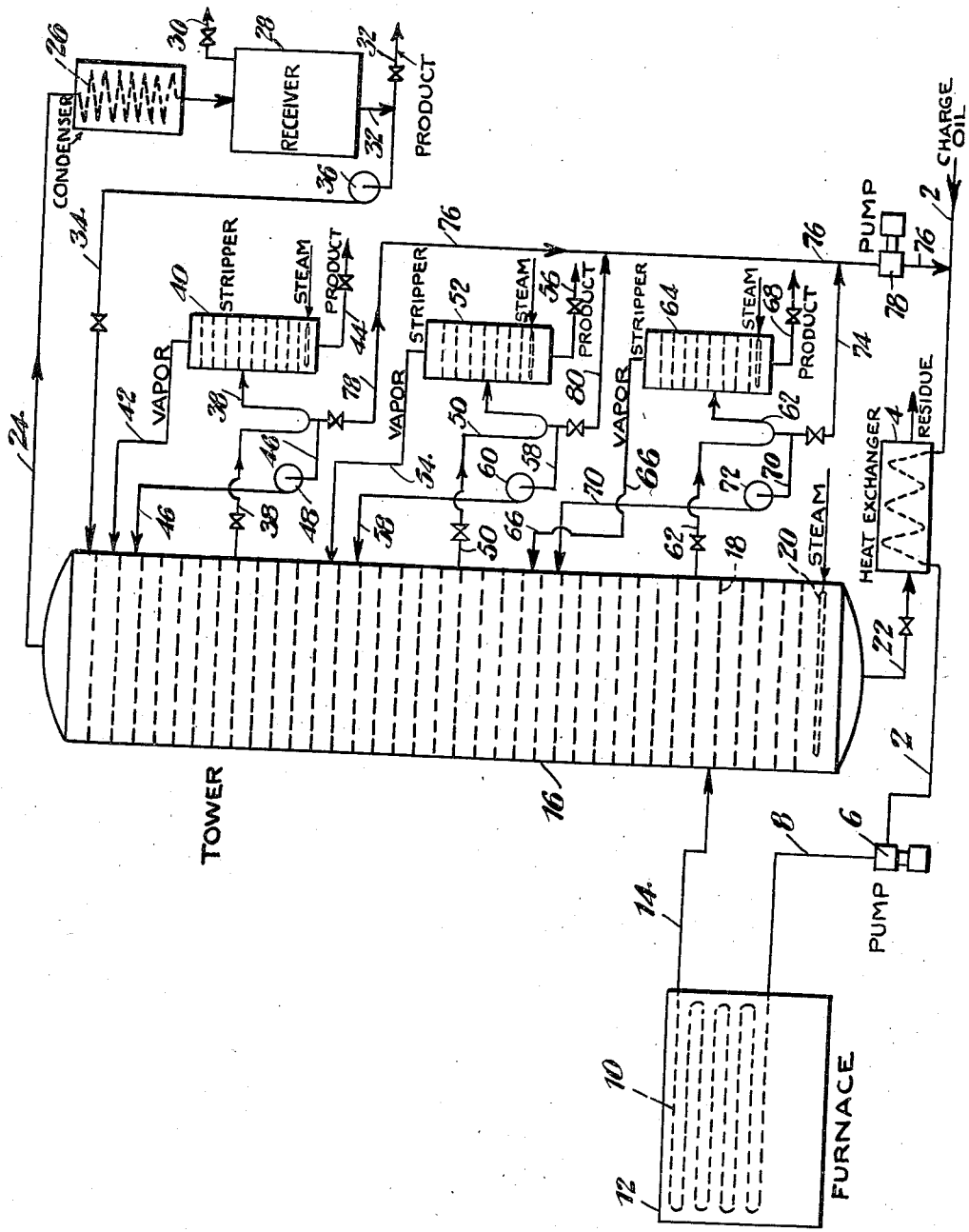
INVENTOR
ANGUS R. BLAKEY
BY
ATTORNEY Patented Mar. 2, 1937

2,072,834

UNITED STATES PATENT OFFICE 2,072,834

FRACTIONAL DISTILLATION OF LIQUIDS

Angus R. Blakey, South Orange, N. J., assignor to Doherty Research Company, New York, N. Y., a corporation of Delaware Application April 10, 1935, Serial No. 15,541

8 Claims. (Cl. 196—94)

The present invention relates to the art of distilling liquid mixtures and more particularly to the fractionation of liquid mixtures which tend to decompose at temperatures which are normally necessary for their distillation. The invention is of particular importance for example, in the distillation of mixtures of organic compounds such for example as tars, alcohols, crude rosins, crude petroleum and petroleum residuums.

This application is a continuation in part of the applicant's earlier filed application Serial No. 367,739 filed June 1st, 1929 for Process and apparatus for the fractional distillation of liquids.

In the fractional distillation of such liquids as those referred to, it is necessary in accordance with the common practice, to distill into the fractionating tower relatively high boiling point constituents in order to effectively drive over and remove the lower boiling point fractions or compounds.

In the normal tower operation in which vapors are passed through, and in intimate contact with, bodies of condensate maintained at progressively lower temperatures in the tower, the condensation of higher boiling constituents causes vaporization of lower boiling constituents contained in the liquid bodies in the tower. There is a constant interchange of heat and of high boiling constituents for lower boiling constituents on the trays in a fractionating tower.

In this type of operation, it has been found that in order to vaporize a given quantity of a low boiling constituent from a given liquid mixture and deliver the same as an overhead product in or from a tower, the quantity of higher boiling constituents which must necessarily be vaporized and passed into the tower decreases with an increase in the proportion of the constituents or fraction which has a boiling point or boiling range near to that of the fraction to be removed overhead. It has been found that a given compound or fraction may be more effectively removed from a mixture, and more effectively fractionated in a tower if the proportion of the next higher boiling compound or fraction is substantially increased in the liquid mixture being subjected to distillation. Furthermore, the vaporization and rectification of the fraction or fractions to be separated from the liquid mixture being distilled is accomplished at much lower temperatures than otherwise would be necessary. Furthermore the presence of an intermediate constituent or fraction in the mixture being distilled suppresses the vaporization of higher boiling material.

Those familiar with the art of distilling liquids agree that a definite quantity of heat is necessary in a tower in order to vaporize and rectify the constituents of the liquid being distilled and to provide a definite temperature gradient in the tower. When the quantity of the material, having a boiling point adjacent to or near that of the desired fraction or product, is insufficient for the purpose of forcing this product through or to the proper position in the tower, then some of the higher boiling material contained in the liquid mixture must be vaporized and passed into the tower in order to supply the necessary heat.

As a general rule, the higher the boiling point of the material, the lower the latent heat of vaporization, and therefore a greater weight of such material must be vaporized than of a lower boiling material in order to supply a given amount of heat in a tower. If relatively high boiling point material must be vaporized into a tower, its concentration in the reflux liquid and vapor in the tower is necessarily increased. Under such conditions the yield of the desired overhead fraction or product obtainable from a given liquid mixture is actually smaller than that which might otherwise be obtained, because of the necessity of preventing any appreciable amount or proportion of the relatively high boiling material from being removed with the overhead product. The vaporization of the higher boiling material also requires higher temperatures than is necessary where an added intermediate fraction is present.

The primary object of the present invention is therefore to provide a process for fractionating liquid mixtures by distillation in which a compound, constituent, or fraction is added to the mixture to be or being fractionated, such compound, constituent, or fraction, having a boiling point higher than, but near that of, the compound, constituent or fraction to be separated from the liquid mixture to be or being fractionated.

A further object of the invention is to provide a process for fractionating liquid mixtures by distillation in which the principle of the invention is applied to a fractionating process involved in the simultaneous production of two or more condensate fractions.

A further object of the invention is the provision of an apparatus adapted to carry out the improved process.

Other and further objects of the invention will be apparent to those skilled in the art from the following more detailed description taken in connection with the accompanying drawing in which:

The figure is a diagrammatic elevational view of an apparatus adapted to carry out the improved process of the present invention.

Referring to the drawing, the liquid mixture to be fractionated which for purposes of illustration may be crude petroleum, is forced into the distilling apparatus through an inlet line 2, and conducted through a heat exchanger 4 in heat exchange with hot residuum produced in the process. The preheated crude oil is then picked up by the pump 6 and forced through a line 8 into a pipe coil 10 of a pipe still furnace 12. In the pipe coil 10 the crude oil is heated to the desired temperature; for example approximately 750° F., and then discharged through a transfer line 14 into the lower portion of a fractionating tower 16 above some of the lower plates therein. The heating of the crude oil in the pipe coil 10 vaporizes substantial proportions of the oil, and produces a foamy intimate mixture of liquid and vapor products which are discharged into the tower.

As the heated crude oil enters the tower 16, the vapors separate from unvaporized oil constituents and pass upwardly through the tower. The separated liquid flows from a tray 18 downwardly over a series of contact trays countercurrent to vapors and superheated steam injected into the base of the tower from the open steam line 20. The petroleum oil residuum reaching the bottom of the tower 16 is withdrawn through a valved line 22 and passed through heat exchanger 4 in heat exchange with the incoming charging stock. This residuum may be subjected to further distillation for the separation of lubricating oil fractions in this same distilling unit, or in another of similar construction if the distillation is to be carried on simultaneously.

The tower 16 is of the well-known bubble cap plate construction in which the vapors passing upwardly through the tower are conducted in intimate contact with reflux condensate contained on all of the plates which serves to provide a multiplicity of vapor liquid contact stages. In describing the operation of the apparatus in connection with the present invention, it will be assumed that the lightest overhead product from the tower will be gasoline, and that other higher boiling products are removed as side streams from the tower. As the vapors pass upwardly through the tower the progressively heavier constituents condense out from the vapors (and lower boiling liquids vaporize) because they are subjected to successively lower temperatures in accordance with the temperature gradient maintained in the tower. These liquid products formed on the various trays overflow from tray to tray downwardly through the tower until they reach a temperature at which they have a tendency to revaporize. It is apparent therefore that in a high tower of the type described, which in actual practice may be 100 feet or more in height, well fractionated side stream products may be withdrawn at various levels.

Therefore in the operation of the tower the gasoline content of the crude oil is taken overhead as vapors through a vapor line 24, and condensed in a condenser 26. The gasoline product is discharged into a receiver 28 which is provided with a gas vent or vacuum line 30 and a liquid discharge line 32. In order to maintain the proper cut temperature in the top of the tower 16 and suppress the vaporization of higher boiling constituents, a regulated portion of the gasoline product is withdrawn from the line 32 and conducted by means of a line 34, in which is mounted a pump 36, onto the top tray in the tower 16. The amount of reflux gasoline put in the top of the tower 16 may be accurately controlled by well-known thermostatic regulating means (not shown) attached to the pump 36.

The heavy naphtha content of the crude oil as fractionated out in the tower 16 may be withdrawn therefrom through a valved line 38 as a side stream and introduced into a stripper 40 which is provided with a vapor line 42 and a valved product discharge line 44. The stripper 40 is also provided with means for introducing steam for the purpose of stripping light constituents from the heavy naphtha product. These light constituents and steam are conducted through the vapor line 42 into the tower 16 below the upper tray as shown.

In order to facilitate the removal of gasoline from the tower 16, and to secure efficient fractionation of the same, a portion of the heavy naphtha withdrawn through the line 38 is conducted through a line 46, in which is mounted a pump 48, into the tower 16 at a point near the top of the tower, below the line 34 and substantially above the outlet line 38. The quantity of heavy naphtha reintroduced into the tower through the line 46 is so regulated as to cause the vaporization of the gasoline constituents at points above the outlet line 38 and hold back higher boiling material. The presence of this excess of heavy naphtha in the upper section of the tower between lines 46 and 38 aids in the removal of the gasoline from the tower and tends to accomplish the same at much lower temperatures than otherwise would be possible. The heavy naphtha withdrawn through the line 38 comprises only a portion of that particular product accumulating on the tray opposite this line. The remainder of the heavy naphtha flows to the next lower trays where it exchanges heat with vapors of higher boiling constituents to condense them and is in turn revaporized.

At a lower point in the tower a kerosene distillate may be withdrawn through a valved line 50 and conducted into a stripper 52 which is constructed and operated in the same manner as stripper 40. Vapors are conducted from stripper 52 into the tower 16 through vapor line 54 below the line 38, while the rectified product free of lower boiling constituents of the type of heavy naphtha is withdrawn through a valved line 56. A portion of the kerosene fraction withdrawn through the line 50 is passed through a line 58, in which is mounted a pump 60, and reintroduced into the tower 16 substantially above the line 50 and below the lines 54 and 38. This kerosene fraction introduced through the line 58 aids in the fractionation in the tower and provides a temperature gradient particularly adapted to drive the gasoline and heavy naphtha into the upper portion of the tower at the lowest possible temperatures.

In the lower portion of the tower, the highest boiling overhead fraction, which may be a gas oil product, is withdrawn through a valved line 62 from a point above the inlet of line 14 and conducted into a stripper 64 which is similar to the strippers 40 and 52 referred to above. Vapors and steam from the stripper 64 are conducted through a vapor line 66 into the tower 16 below the line 58, while the gas oil product is withdrawn through a valved line 68. A portion of the gas oil product withdrawn through the line 62 is passed through a line 70, in which is mounted a pump 72, and reintroduced into the tower 16 at a point above the line 62 and below lines 66 and 50. The presence of this gas oil in this section of the tower below lines 50 and 66 serves to narrow the section of the tower through which the kerosene fraction must be forced as a result of the temperature attained by the products introduced through line 14. Furthermore the section of the tower below the line 70 and above the line 62 serves as a gas oil fractionation section having a relatively narrow temperature gradient.

In the specific example described above, the use of the reintroduced heavy naphtha, kerosene and gas oil fractions are of particular importance in connection with the narrow temperature gradients provided for fractionating these different products and also from the standpoint of providing a fraction which is closely adjacent in average boiling point to that of the next lighter fraction to be removed from the system.

In the distillation of crude petroleum oils in processes of the type referred to above, the petroleum oil residuum passing from the tray 18 downwardly through the lower portion of the column naturally contains some lower boiling constituents of the gas oil type which should preferably be contained in the fraction withdrawn through the line 62. The steam introduced through the line 20 serves to drive up some of these constituents. The amount of such products in the residuum may also be reduced by introducing into the pipe still furnace through the line 2, along with the crude oil, a slightly lighter boiling fraction which would remain with the liquid residue in tower 16 and suppress its vaporization.

It is also advantageous to return a portion of the gas oil to the pipe still, which may be accomplished by conducting some of this fraction from the line 62 through a valved connecting line 74 and a line 76 in which is mounted a pump 78, and introducing it into the line 2 which leads to the pipe still furnace coil 10. The presence of the gas oil fraction in the crude oil mixture heated in the furnace 12 makes it possible to use a somewhat lower temperature in the furnace than otherwise would be the case because of the driving action of this higher boiling material on the gasoline, naphtha and kerosene constituents contained in the crude.

For similar reasons a portion of the naphtha fraction withdrawn through the line 38 may be conducted through a valved connecting line 78 into the line 76 and thereafter introduced into the crude oil heated in the furnace 12. A fraction of the kerosene withdrawn through the line 50 may also be conducted through a connecting line 80 into the line 76 and then with the crude oil into the pipe still furnace 12. From the above description it is apparent that a portion of any of the fractions withdrawn through the lines 38, 50 and 62 may be conducted singly or together through the line 76 and mixed with the crude oil passed to the pipe still furnace 12. The reintroduction of portions of all of these fractions serves to maintain the lowest possible temperature gradient throughout the tower and provides a method for taking over the gasoline at the lowest possible temperature. Likewise the return of a portion of any other single fraction has these advantages for the distillation and fractionation of constituents lighter than itself.

In starting the apparatus, any outside distillate or distillates may be introduced into the line 2 along with the crude oil, or such distillates may be introduced into the tower at the appropriate point through lines 46, 58 and 70, or either of these lines. Furthermore if the crude oil being distilled is deficient in any particular fraction such as the kerosene fraction, a suitable outside kerosene distillate may be introduced through line 2, or line 58 preferably at a temperature corresponding to or slightly above that prevailing at this point of the tower.

While the invention has been described in connection with the treatment of crude petroleum oil, this description is merely an example of the application of the invention to one particular mixture of constituents. It is obvious that the invention may be applied to the distillation and fractionation of other liquid mixtures such as alcohols or esters, or to the production of lubricating oil fractions from topped crude oils or other oil fractions. The use of low temperatures is of particular importance in producing lubricating oils in order to avoid cracking. In this respect the process has the distinct advantage of the low temperatures employed in vacuum distillation and at the same time the added advantage of the thorough rectification of the vapors.

Instead of running crude petroleum through the apparatus as shown, a petroleum oil residuum containing the lubricating fractions may be run through the apparatus in a manner such that a gas oil or light lubricant is taken overhead through the vapor line 24. In such an operation, it is a distinct advantage to operate under a vacuum which may be applied to the apparatus through the line 30 by any suitable vacuum pump or equivalent apparatus element. Successively higher boiling lubricating oil fractions will be withdrawn from the apparatus through the lines 44, 56 and 68 respectively. In distilling over lubricants the bottom residuum withdrawn from the tower 16 through the line 22 may be an asphaltic or a heavy paraffinic residue, depending upon the original or type of the oil being treated.

The invention may also be used in the distillation of crude rosin mixtures in which it is also important that decomposition be avoided and at the same time secure a good fractionation of the material.

The apparatus shown in the drawing and described in this specification is merely an example of the type of apparatus adapted to carry out the process of the invention, and it is to be understood that certain modifications of the apparatus may be made without departing from the spirit of the invention. For example, the number of side streams withdrawn, and consequently the number of strippers employed, may vary in accordance with the number of fractions to be produced in a single running of the original stock.

Having thus described the invention in its preferred form, what is claimed as new is:

1. The process of fractionating petroleum oil for the purpose of producing a plurality of fractional condensates therefrom, which comprises heating the oil to be fractionated in a confined stream of restricted cross-section in a heating zone and discharging the resultant heated products into a separating zone from which unvaporized constituents are separated from vapors formed by the heating operation, passing the vapors upwardly through a fractionating tower in intimate contact with and countercurrent to reflux condensates passing downwardly through said tower, said intimate contact being effected in a multiplicity of vapor-liquid contact stages, withdrawing a plurality of side stream condensates from said tower at various levels thereof separated by a plurality of vapor-liquid contact stages, and reintroducing a portion of each stream at approximately its withdrawal temperature into the tower at a point directly below the point of withdrawal of the stream next above, and passing the remaining portion of each stream into a stripping zone and therein removing the lower boiling undesired constituents.

2. The process of fractionating petroleum oils for the purpose of producing a plurality of fractional condensates therefrom, which comprises passing the petroleum oil containing an added fraction having a boiling point immediately higher than that of the highest boiling fraction to be removed from the oil through a heating zone in a confined stream of restricted cross-section, discharging the resulting heated products at a temperature sufficient to vaporize the desired fractions into a separating zone, passing the resulting vapors into a fractionating tower and therein rectifying the vapors while passing them in repeated contact with condensates passing downwardly through the tower in a series of vapor-liquid contact stages, withdrawing vapors overhead from the tower and a side stream fractional condensate product from the tower, and reintroducing a portion only of said side stream condensate product at approximately its withdrawal temperature into the tower a plurality of contact stages above the point of withdrawal of the side stream from the tower.

3. The process of fractionating petroleum oil as defined by claim 1 in which the lower boiling constituents removed from each stripping zone are reintroduced into the tower at a point above the point of reintroduction of the portion of condensate stream from which the stripped constituents are derived and below the point of withdrawal of the next lower boiling condensate.

4. The process of fractionating petroleum oil vapors for the purpose of obtaining a rectified overhead product, and a rectified side stream condensate which comprises passing vapors of the petroleum oil to be fractionated through a series of rectifying zones of progressively decreasing temperature in a fractionating tower, passing reflux condensate downwardly through the said tower countercurrent to said vapor, intimately contacting ascending vapors with reflux condensate in each zone, withdrawing a rectified vapor fraction overhead from said tower, condensing the same and returning a portion thereof to the upper part of the tower to aid in the rectification of the vapors therein, withdrawing a side stream condensate from said tower as a fraction of said oil, introducing a portion of said withdrawn condensate at approximately its withdrawal temperature into the tower at a point sufficiently above the point of its withdrawal to secure a plurality of intimate contacts with ascending vapors before it again reaches the level in the tower from which it was withdrawn, said point of introduction being below but not substantially below the point of introduction of said overhead reflux condensate whereby the lower boiling point constituents are stripped from the reflux condensate in the upper portion of the tower by the presence of the relatively hot higher boiling side stream condensate reintroduced thereinto.

5. The process of fractionating petroleum oil vapors for the purpose of obtaining a plurality of fractional condensates therefrom, which comprises passing the vapors through a series of rectifying zones of progressively decreasing temperature in a fractionating tower, passing reflux condensate downwardly through said tower and from zone to zone therein and from stage to stage in each zone, withdrawing a rectified condensate as a fraction from each zone of said tower, and passing at least a portion thereof while at substantially its withdrawal temperature into the tower a plurality of stages of rectification above its point of withdrawal and below the point of withdrawal of the next adjacent lower boiling point condensate to aid in the rectification of the vapors therein and to force lower boiling constituents into zones of lower temperature.

6. The process of fractionating petroleum oil vapors to produce a plurality of fractional condensates therefrom, which comprises passing the vapors upwardly through a fractionating tower countercurrent to the passage of reflux condensates flowing downwardly through a multiplicity of vapor-liquid contact stages in the tower, withdrawing a plurality of side stream condensates from said tower at various points therealong, passing a portion of each side stream at approximately its withdrawal temperature into the tower at a point a plurality of contact stages above the point of its withdrawal and below the point of withdrawal of the next lower boiling point condensate, and passing the remaining portion of each side stream into a side stream stripper where lower boiling point constituents are stripped therefrom, and passing the vapors resulting from each stripping operation into the tower below the point of withdrawal of the next lower boiling point condensate.

7. The process of fractionating petroleum oil vapors for the purpose of obtaining a plurality of fractional condensates therefrom, which comprises passing vapors of the petroleum oil to be fractionated through a series of rectifying zones of progressively decreasing temperature in a fractionating tower, effecting intimate contact between vapor and liquid reflux in each zone, passing reflux condensate downwardly through said tower countercurrent to said vapors, withdrawing a side stream condensate from said tower as a fraction of said oil, introducing an oil fraction of approximately the boiling point of said withdrawn side stream condensate at approximately the temperature of the withdrawn condensate at the time of its withdrawal into the tower at a point sufficiently above the point of withdrawal of said fraction to secure a series of stages of intimate contact between ascending vapors and said introduced oil fraction above said point of withdrawal, and causing a similar material contained in the tower to flow downwardly therethrough to a point below the point of withdrawal of said fraction whereby said fraction is withdrawn from a zone containing an abnormally high proportion or concentration of the constituents of said fraction.

8. The process of fractionating petroleum oil vapors for the purpose of obtaining a rectified overhead product, and a rectified side stream condensate which comprises passing vapors of the petroleum oil to be fractionated through a series of rectifying zones of progressively decreasing temperature in a fractionating tower, passing reflux condensate downwardly through the said tower countercurrent to said vapors, intimately contacting ascending vapors with reflux condensate in each zone, withdrawing a rectified vapor fraction overhead from said tower, dividing the reflux condensate at a predetermined level in said tower by permitting the passage of one portion thereof downwardly therefrom in the tower as a refluxing medium, removing a second portion as a rectified side stream condensate product of the fractionating operation and conducting a third portion at approximately the temperature of the condensate at said level to a higher point in the tower where it is mingled with relatively cooler reflux condensate flowing downwardly therethrough, said point being sufficiently above said level to secure a plurality of intimate contacts between the resulting liquid mixture and the vapors rising through said tower above said level, whereby relatively low boiling point constituents are stripped from the down-flowing reflux condensate coming into contact with the hotter third portion condensate at said point.

ANGUS R. BLAKEY.